United States Patent [19]

Skotheim

[11] Patent Number: 5,648,187
[45] Date of Patent: *Jul. 15, 1997

[54] STABILIZED ANODE FOR LITHIUM-POLYMER BATTERIES

[75] Inventor: Terje Absjorn Skotheim, Shoreham, N.Y.

[73] Assignee: Moltech Corporation, Tucson, Ariz.

[ * ] Notice: The term of this patent shall not extend beyond the expiration date of Pat. No. 5,460,905.

[21] Appl. No.: 618,111

[22] Filed: Mar. 19, 1996

Related U.S. Application Data

[63] Continuation of Ser. No. 197,140, Feb. 16, 1994, abandoned.

[51] Int. Cl.$^6$ ................................................ H01M 4/02
[52] U.S. Cl. .................... 429/213; 429/192; 429/218
[58] Field of Search .............................. 429/213, 212, 429/192, 194, 191, 218

[56] References Cited

U.S. PATENT DOCUMENTS

| | | | |
|---|---|---|---|
| 4,609,600 | 9/1986 | Heinze et al. | 429/197 |
| 4,812,375 | 3/1989 | Foster | 429/101 |
| 5,354,631 | 10/1994 | Chaloner-Gill et al. | 429/137 |
| 5,387,482 | 2/1995 | Anani | 424/141 |
| 5,437,692 | 8/1995 | Dasgupta et al. | 29/623.1 |
| 5,460,905 | 10/1995 | Skotheim | 424/213 |
| 5,462,566 | 10/1995 | Skotheim | 29/623.1 |

FOREIGN PATENT DOCUMENTS 163188  9/1983  Japan.

OTHER PUBLICATIONS

"Electrochemical and Electric Properties of Vacuum-Deposited Poly(arylene)s: Electrochemical Activity, Diode, and Electroluminescence", J. Physical Chemistry vol. 96, No. 22, Oct. 29, 1992, 8679–8682.

*Primary Examiner*—M. Nuzzolillo
*Attorney, Agent, or Firm*—Morrison & Foerster LLP

[57] ABSTRACT

The invention relates to thin film solid state electrochemical cells consisting of a lithium metal anode, a polymer electrolyte and a cathode, where the lithium anode has been stabilized with a polymer film capable of transmitting lithium ions.

31 Claims, 5 Drawing Sheets

Lithium - Polymer Cell

Lithium - Polymer Cell

Storage Effect

Li/SPE/Li

3A

Li/PPP/SPE/PPP/Li

3B

Constant Voltage Effect On Li/SPE/Li (O) and Li/PPP/SPE/PPP/Li (●) Cells

STABILIZED ANODE FOR LITHIUM-POLYMER BATTERIES

This application is a continuation, of application Ser. No. 197,140, filed Feb. 16, 1994, now abandoned.

BACKGROUND OF THE INVENTION

1. Field of the Invention

This invention relates to thin film solid state electrochemical cells. More particularly, this invention relates to novel stabilized negative electrodes for electrochemical cells, consisting of a lithium metal coated with a thin film of an electroactive polymer capable of transmitting alkali metal ions interposed between the lithium anode and the polymer electrolyte.

2. Prior Art

Rechargeable lithium-polymer batteries are promising advanced power sources for a variety of applications such as to portable electronic devices and electric vehicles. Although a variety of polymer electrolytes have been investigated as the ionic conducting medium, the reactivity of lithium metal has posed a formidable challenge to develop polymer electrolytes which have the requisite chemical and electrochemical stability for long cycle life [F. M. Gray, *Solid Polymer Electrolytes* (VCH Publishers, Inc., New York 1991)].

A key problem with lithium metal anodes is the formation of dendrites upon repeated plating of lithium metal during charging of the battery. This has led to a detailed investigation of lithium alloys, such as lithium-aluminum alloys, and lithium-carbon composites as alternatives to lithium metal anodes. U.S. Pat. No. 4,002,492 discloses electrochemical cells having anodes consisting of lithium-aluminum alloys where the content of lithium is from 63% to 92%. Other disclosures of lithium-aluminum anodes are found in Rao, et al., J. Electrochem. Soc. 124, 1490 (1977), and Besenhard, J. Electrochem. Soc., 94, 77 (1978). The use of lithium-carbon composite anodes is disclosed in Ozawa et al., in Proc. Tenth International Seminar on Primary and Secondary Battery Technology, Deerfield Beach, Fla., March 1993.

The central problem with composite lithium anodes is an increase in weight and volume due to the addition of non-electroactive materials. In the case of lithium-aluminum alloys, there is also a loss in potential of about 0.4 V. The loss in cell voltage coupled with increased weight implies a significant loss in specific energy of the cell. Batteries using lithium-aluminum alloys as anodes have exhibited relatively low capacities, low rate capabilities and poor cycle life.

Lithium-carbon composites based on intercalation in graphitic carbon generally have a voltage drop of 0.3 V–0.5 V vs. lithium and typically involve 8–10 carbon atoms for each lithium atom, the theoretical maximum being 6 carbon atoms for each lithium atom. This entails a significant penalty in increased weight and volume, and, consequently, decreased capacity. Cells using lithium-carbon composite anodes have, however, demonstrated long cycle life, with more than 1,000 cycles recorded.

Shacklette, et al., disclose the use of a conjugated polymer-lithium composite anode in U.S. Pat. No. 4,695,521, which incorporates an n-doped conjugated polymer as a substrate for electroplating a lithium metal, resulting in finely divided lithium metal distributed throughout a conducting polymer matrix. Cells incorporating conjugated polymer-lithium composite anodes have long cycle life, but reduced capacity. The n-doped conjugated polymers have low capacity that limits the capacity of the anode material.

Toyoguchi, et al., disclose the use of a prefabricated film of a conjugated polymer to coat the lithium surface of an anode in a cell using a liquid organic electrolyte in kokai 58-163188 (1983). Cells with lithium anodes coated with a conjugated polymer showed enhanced cycling ability compared with equivalent cells using bare lithium anodes. Prefabricated conjugated polymer films are highly porous and at least 10 micrometers thick in order to have sufficient mechanical strength to be free-standing. Porous films are not suitable if the electrolyte is polymeric since a polymer electrolyte cannot penetrate the pores of the film, resulting in inferior contact between the conjugated polymer and the electrolyte. With liquid organic electrolyte, a porous film does not provide complete surface coverage, and therefore not as complete protection as a dense polymer film. The relatively thick prefabricated conjugated polymer films also add significant weight and volume to the cell, limiting the capacity of the cell.

There is a clearly defined need, therefore, for novel concepts in interfacial engineering of the lithium-electrolyte interface that allows the fabrication of rechargeable lithium cells having long cycle life and incorporating polymer electrolytes.

SUMMARY OF THE PRESENT INVENTION

The present invention obviates one or more of the disadvantages of electrochemical cells using anodes made from lithium alloys, lithium-carbon composites and lithium-conducting polymer composites, by providing a lithium metal anode that has been stabilized against dendrite formation by the use of a vacuum evaporated thin film of a lithium-ion conducting polymer interposed between the lithium metal and the electrolyte. The present invention also provides a rechargeable, high energy density electrochemical battery cell that contains:

(a) a lithium anode;

(b) a thin film of a lithium metal-ion conducting polymer which is doped n-type by the incorporation of lithium ions and which is deposited on the lithium anode surface by vacuum evaporation;

(c) a non-aqueous liquid or polymeric electrolyte containing a lithium salt dissolved therein; and (d) a cathode containing a cathode active material.

As a result of the present invention, rechargeable lithium-cells are provided having a higher energy density and longer cycle life than has previously been achieved.

For a better understanding of the present invention, reference is made to the following description and the accompanying drawings. The scope of the invention will be pointed out in the appended claims.

DESCRIPTION OF THE PREFERRED EMBODIMENTS

Figure 1:
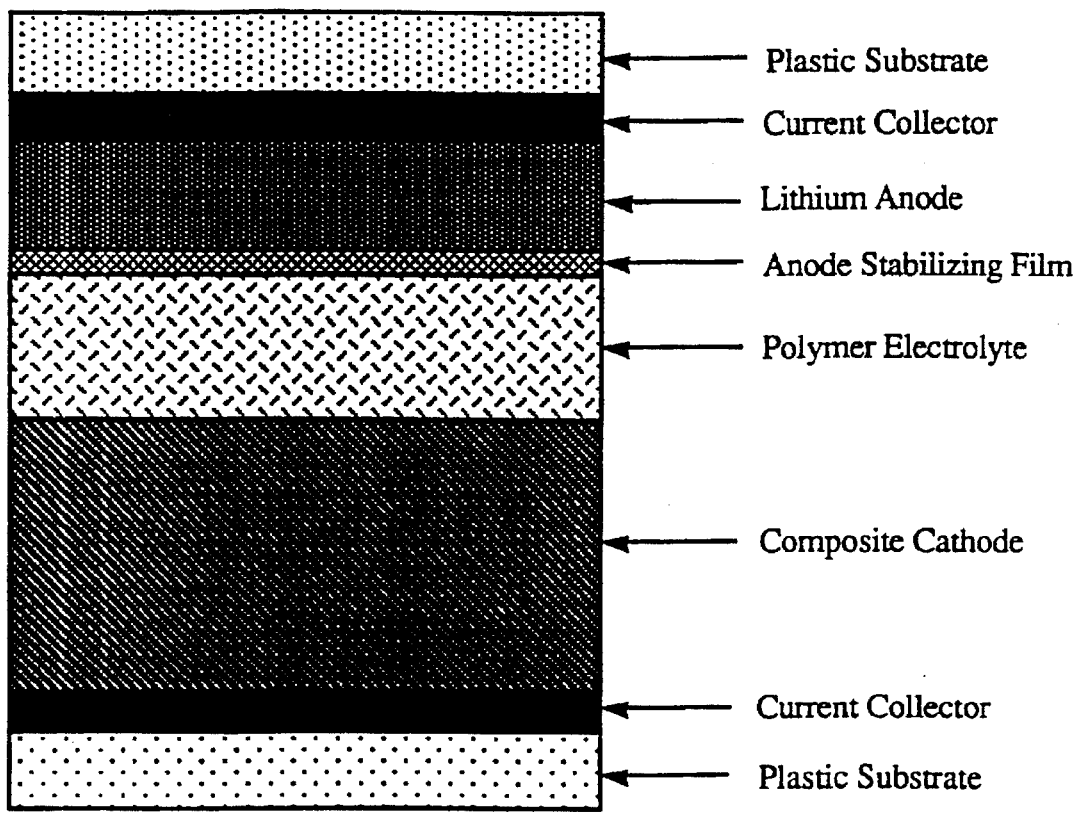
FIG. 1 shows a schematic structure of a cell incorporating a lithium-ion conducting film interposed between the lithium metal anode and the polymer electrolyte.

The novel cell of this invention contains as an essential element a vacuum evaporated polymer film interposed between a lithium metal anode and an electrolyte, where the polymer film has the capability to transmit lithium ions and to reduce the formation of dendrites on the lithium surface. The vacuum evaporated film is dense and provides complete surface coverage.

Certain conjugated polymers, such as polyacetylene and poly(p-phenylene), can be doped with lithium ions to be electrically conductive. In the form of thin films, the polymers have the ability to transmit lithium ions by diffusion as demonstrated by their electrochemical reversibility for lithium ion insertion and de-insertion. Thin films of the conjugated polymers can be doped by lithium ions by contacting them with lithium metal. The lithium metal dissolves lithium ions which diffuse into the polymer structure up to a certain maximum concentration.

In the present invention, a thin film of a conjugated polymeric structure is placed at the interface between the lithium metal anode and the polymer electrolyte. With a bare lithium anode, the charge/discharge reaction at the anode of the cell is

With the lithium electrode coated with a lithium ion transmitting polymer layer, the charge/discharge reaction becomes

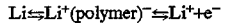

Charging and discharging reactions at a bare lithium surface in an organic electrolyte, leads to irreversible changes of the lithium surface. Upon stripping of lithium metal into lithium ions in the electrolyte, the dissolution occurs non-uniformly across the surface, leading to a roughening of the surface. Upon re-deposition of lithium ions onto the lithium metal surface, the plating does not occur uniformly but preferentially at the protruding points on the surface, leading ultimately to the formation of dendrites and a shorting of the cell. Some dendritic material will be encapsulated and no longer accessible for cycling, requiring an excess of lithium. The high surface area of the lithium that results from the dendritic growth and subsequent encapsulation poses severe safety hazards.

When the lithium surface is coated with an evaporated lithium ion conducting polymer film, the film is doped by dissolution of lithium into lithium ions which diffuse into the film until a maximum concentration is reached. This renders the polymer film electrically conducting and capable of transmitting lithium ions between the lithium metal anode and the electrolyte. During the discharge process, lithium ions will enter the electrolyte from the polymer film and lithium metal ions will dissolve into the polymer film at the lithium-polymer interface. The lithium-doped polymer film provides a constant potential across the lithium metal surface due to its high electrical conductivity, thereby providing thermodynamically more favorable stripping conditions without pitting of the electrode surface. In addition, the polymer film has the ability to dissolve micro-dendrites as they are formed.

Similarly, during the plating of lithium from the electrolyte, the plating takes place solely at the lithium-conducting polymer interface where a uniform potential is maintained. Therefore, no preferential deposition occurs at protruding areas of the lithium surface.

The ability to prevent the formation of dendrites that can electrically short the cell, allows the fabrication of cells with thinner polymer electrolyte films. This provides cells with higher capacity for energy storage by weight and volume.

FIG. 1 shows schematically the structure of a cell incorporating an electrically conducting film capable of transmitting lithium ions interposed between the lithium metal anode and the electrolyte. The thickness of the electroconducting film is from 0.01 μm to 10 μm, with the preferred thickness being from 0.1 μm to 5 μm.

Evaporation in a vacuum is the preferred method of deposition of the electroconductive film. Vacuum deposition provides dense films and complete surface coverage. If the vacuum deposition uses low molecular monomeric or oligomeric materials as evaporation sources, the evaporation may be performed through a plasma which polymerizes the monomers or oligomers to provide an insoluble film on the lithium surface.

The electroconductive film may be evaporated onto the lithium surface followed by lamination of the polymer coated anode with the polymer electrolyte, or deposition of the polymer electrolyte onto the electroconductive film by other means, such as extrusion. Alternatively, the electroconductive film may be evaporated onto the polymer electrolyte, followed by subsequent lamination with a lithium foil electrode, or thermal evaporation of the lithium electrode onto the electroconductive film in a vacuum.

Useful starting polymers for the formation of the electroconductive polymer film may be any conjugated structure which is capable of being doped electrically conductive by lithium ions, such as poly(p-phenylene), polyacetylene, poly (phenylene vinylene), polyazulene, poly(perinaphthalene) polyacenes and poly(naphthalene-2,6-diyl). This list of polymers is illustrative and not intended to be exhaustive. Amongst these illustrative conjugated polymers, poly(p-phenylene) is preferred.

Figure 2A:
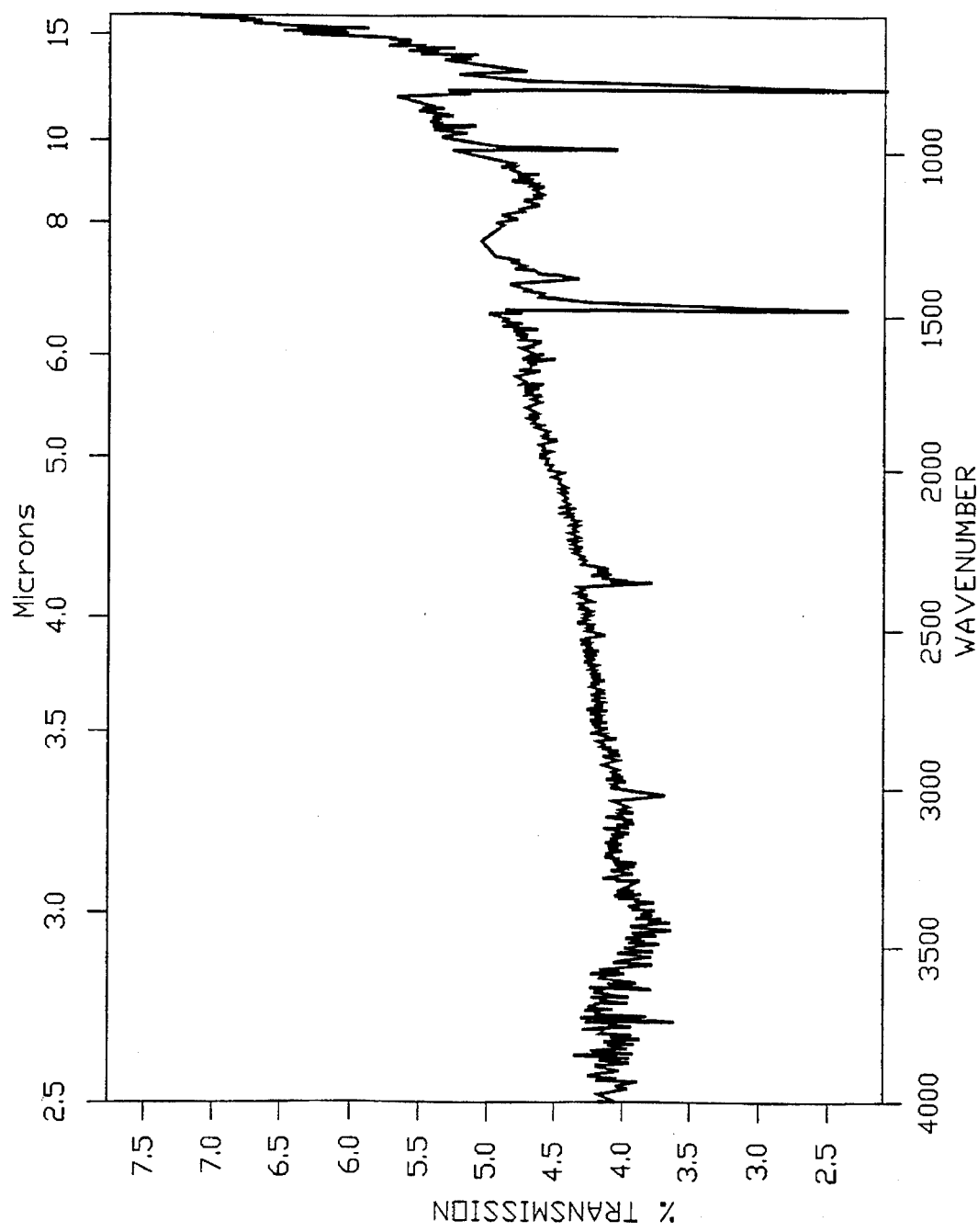
FIG. 2 shows infrared (IR) spectra of poly(p-phenylene) powder in KBr (A) and a PPP film evaporated onto a silicon wafer (B).
Figure 2B:
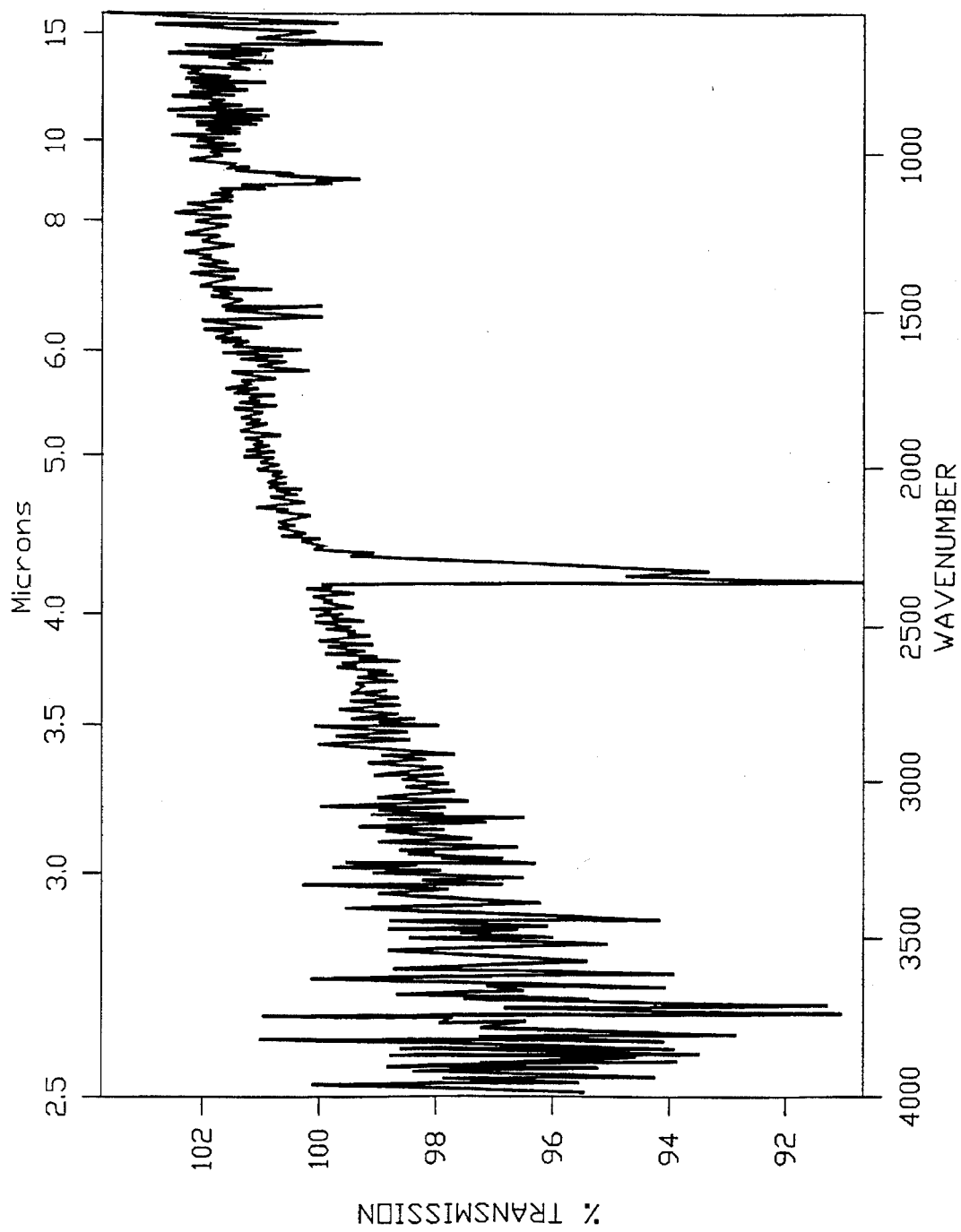

When the polymer film is deposited by vacuum evaporation the resulting polymer may have a structure which is different from the starting material. FIG. 2 shows the IR spectrum of a poly(p-phenylene) film mixed in powder form in a KBr pellet (A) compared with the IR spectrum of a 0.1 μm film deposited on a silicon wafer by thermal vacuum evaporation using poly(p-phenylene) as the starting material. The starting polymer is decomposed thermally during the evaporation process. The polymer decomposition leads to formation of highly reactive fragments of lower molecular weight. Polymerization occurs by recombination of these reactive fragments on the substrate surface. The deposited film is not poly(p-phenylene), as can be clearly seen from the IR spectra, but a highly crosslinked and branched electroconductive polymer film which can be doped with lithium ions. Vacuum deposition of electroconductive films using conjugated polymers as starting materials have been disclosed by Yamamoto et al., in J. Physical Chemistry, vol. 96, p. 8677 (1992).

Similarly, films may be produced by using oligomers of varying molecular weight as starting material. If crosslinked, insoluble films are desired, the oligomer vacuum evaporation may be performed through a plasma which generates reactive groups that lead to polymerization on the substrate surface.

The electrolyte may be a thin film of a solid polymer electrolyte, such as an amorphous polyether, a branched polysiloxane with ethylene oxide side chains or a branched polyphosphazene with ethylene oxide side chains, into which is dissolved a lithium salt. The conductivity of the polymer electrolyte may be enhanced by the addition of plasticizing compounds of low molecular weight, such as propylene carbonate, ethylene carbonate, N-methyl acetamide. sulfonate, sulfolane, 1,2-dimethoxyethane, poly (ethylene glycol), 1,3-dioxolane and glymes. Plasticized polymer electrolytes are also known as gel polymer electrolytes. The polymer electrolyte may be an exclusive cation conducting polymer electrolyte, a so-called single-ion conductor, wherein the anionic charges are covalently attached to the polymer backbone. The conductivity of the single-ion conducting polymer electrolytes may be enhanced by the addition of plasticizing compounds. Useful lithium salts are $LiCF_3SO_3$, $LiClO_4$, $LiAsF_6$, $LiPF_6$, $LiN(SO_2CF_3)_2$, $LiC(SO_2CF_3)_3$ and lithium salts of fluorosulfonated phenols and pyrroles. The preferred thickness of the polymer electrolyte is from 1 μm to 50 μm, most preferably from 1 μm to 25 μm.

Suitable cathode active materials can be selected from the group of inorganic insertion oxides and sulfides, organo-sulfur compounds and conjugated polymers. Useful inorganic insertion oxides include $CoO_2$, $NiO_2$, $MnO_2$, $Mn_2O_4$, $V_6O_{13}$ and $V_2O_5$. Useful inorganic sulfides include $TiS_2$ and $MoS_2$. Useful organo-sulfur materials include polymerization/depolymerization compounds as disclosed in U.S. Pat. No. 4,833,048 and polymers such as poly (carbon disulfide). Suitable conjugated polymers include polyacetylene, poly(phenylene vinylene) and polyaniline. Typically, the cathode is a composite material consisting of cathode active material (40–70%), polymer electrolyte for ionic conductivity (20–50%) and carbon black for electronic conductivity (5–20%). The composite cathode may also contain a small fraction (1–5%) of a binder, for example teflon, for mechanical stability.

Details of the preferred embodiments have been set forth herein in the form of examples which are described below.

EXAMPLES

Example 1

Interface Stability Studied by ac Impedance Spectroscopy

Figure 3:
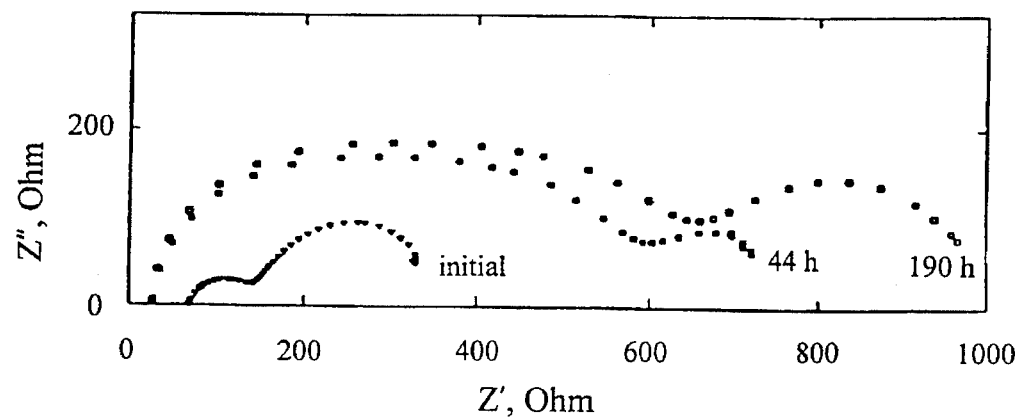
FIGS. 3A and 3B show ac impedance spectra as a function of time for symmetrical cells Li/SPE/Li (3A) and Li/PPP/SPE/PPP/Li (3B), where SPE designates a Solid Polymer Electrolyte, and PPP designates an evaporated interfacial film where poly(p-phenylene) was the starting material for the evaporation.
Figure 3:
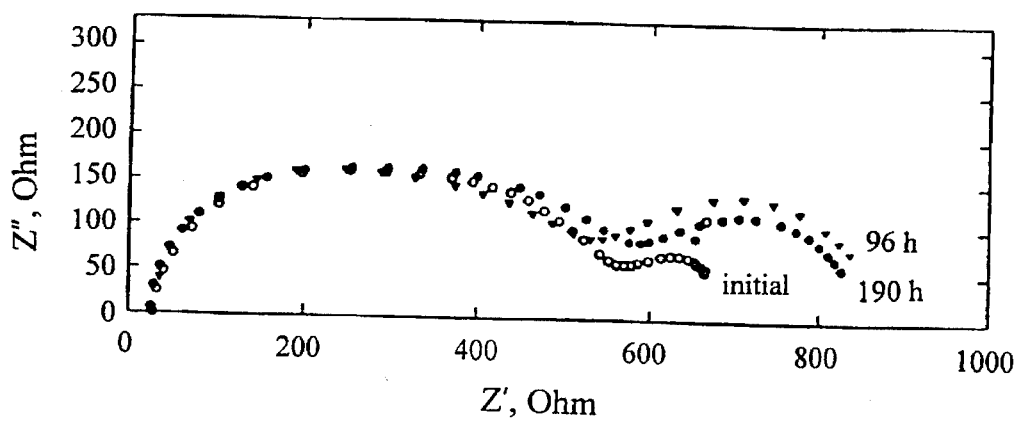

A 0.1 micron film of PPP was deposited by thermal vacuum evaporation onto two lithium foils using poly(p-phenylene) as the starting material. The vacuum chamber was placed inside an argon atmosphere glove box. The residual pressure in the chamber was 0.01–0.02 torr and the evaporation temperature 300 deg.–350 deg. C. Symmetrical cells of the construction Li/SPE/Li and Li/PPP/SPE/PPP/Li were constructed, where SPE designates solid polymer electrolyte and PPP is the resulting film deposited by thermal evaporation of poly(p-phenylene). The SPE consisted of a 25 micron thick Celgard 2500 membrane soaked in a liquid branched polysiloxane with $LiCF_3SO_2$ salt, where the Li/O ratio was 1/24. FIG. 3 shows the ac impedance spectra of the two symmetrical cells as a function of time. The time evolution of the ac impedance spectrum of the Li/SPE/Li cell (3A) shows a lack of stabilization even after long times. This implies a continuing chemical reaction between the lithium electrode and the polymer electrolyte resulting in the build-up of a highly resistive interfacial layer. With the PPP interfacial film (3B) the ac impedance spectra show an initial increase in the interfacial resistance at short times followed by stabilization.

Example 2

Interfacial Stability Studied by Current-Voltage Characteristics

Figure 4:
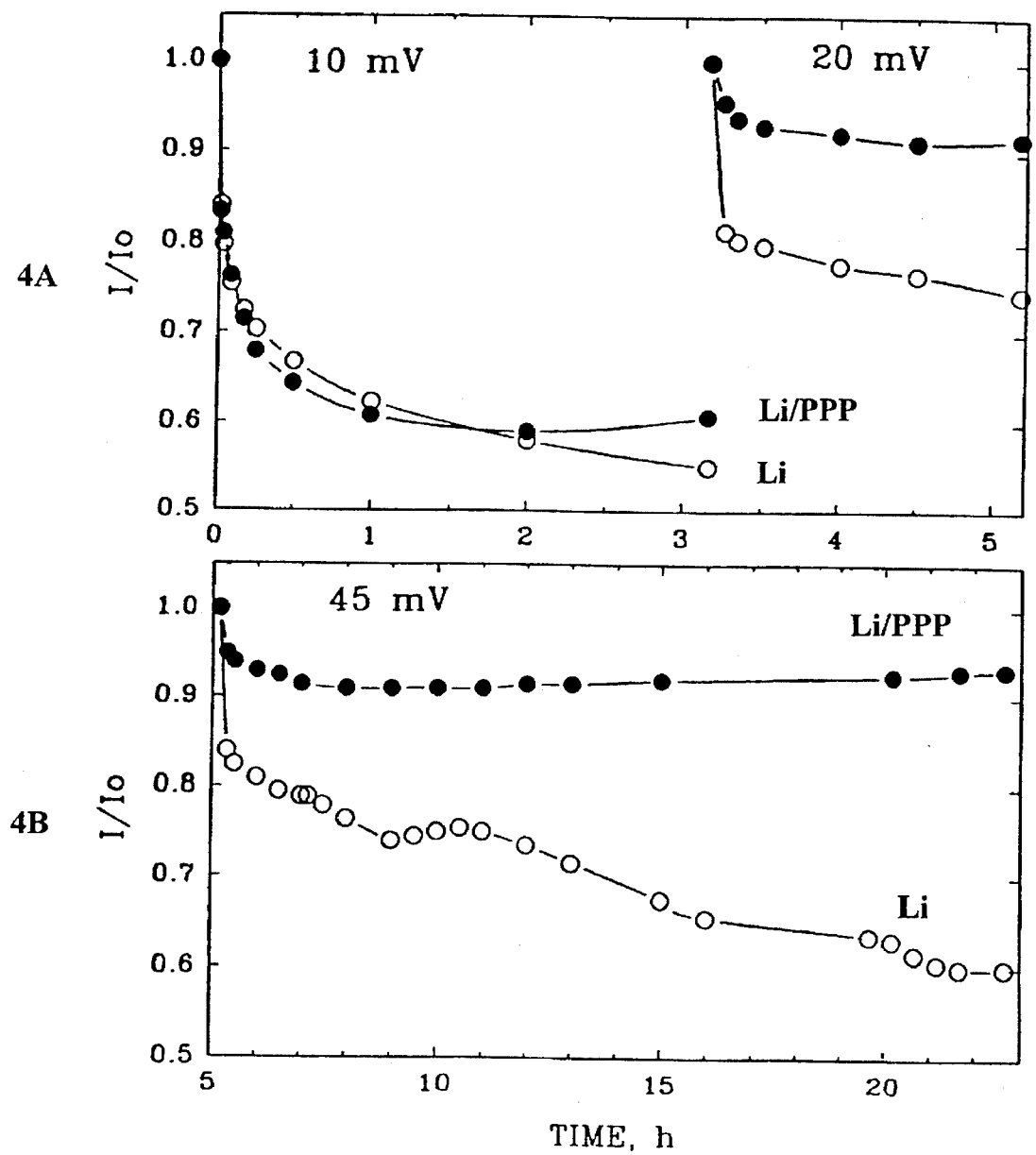
FIGS. 4A and 4B show current-voltage effects on Li/SPE/Li (○) and Li/PPP/SPE/PPP/Li (●) cells as a function of time, for 10 mV and 20 mV (4A) and 45 mV (4B).

Symmetrical cells were constructed as in Example 1. The stability of the lithium-SPE and the lithium-PPP-SPE interfaces was studied under conditions of direct current passing through the interface. Constant potentials were maintained across the cells and the currents were monitored. Voltages of 10 mV, 20 mV and 45 mV were used. The results are shown in FIGS. 4A and 4B. The current passing through the Li/SPE/Li cell continues to drop for the duration of the experiment, whereas the current passing through the Li/PPP/SPE/PPP/Li cell levels off after an initial decay. A continuous decrease in the current with time with constant potential implies that the interfacial resistance increases.

What is claimed is:

1. A battery cell comprising:
   (a) a lithium anode;
   (b) a non-aqueous organic electrolyte containing a dissolved lithium salt;
   (c) an electrically conducting crosslinked polymer film interposed between the lithium anode and the electrolyte; said electrically conducting crosslinked polymer film being capable of transmitting lithium ions between the lithium anode and the electrolyte; and
   (d) a cathode.

2. A battery cell according to claim 1, wherein said electrically conducting crosslinked polymer film is deposited by vacuum evaporation on said lithium anode.

3. A battery cell according to claim 1, wherein said electrolyte is a polymer electrolyte containing a dissolved lithium salt.

4. A battery cell according to claim 3, wherein said polymer electrolyte is a single-ion conducting polymer electrolyte.

5. A battery cell according to claim 3, wherein the polymer electrolyte is a gel polymer electrolyte.

6. A battery cell according to claim 3, wherein said electrically conducting crosslinked polymer film is deposited by vacuum evaporation on said polymer electrolyte.

7. A battery cell according to claim 1, wherein said electrically conducting crosslinked polymer film is deposited by plasma-assisted vacuum evaporation.

8. A battery cell according to claim 1, wherein said electrically conducting crosslinked polymer film is vacuum deposited using a conjugated polymer as an evaporation source.

9. A battery cell according to claim 8, wherein said conjugated polymer source is selected from the group consisting of poly(p-phenylene), polyacetylene, poly(phenylene vinylene), polyazulene, poly(perinaphthalene), polyacenes, and poly(naphthalene-2,6-diyl).

10. A battery cell according to claim 1, wherein said lithium salt is selected from $LiCF_3SO_3$, $LiClO_4$, $LiAsF_6$, $LiPF_6$, $LiN(SO_2CF_3)_2$, $LiC(SO_2CF_3)_3$ and lithium salts of fluorosulfonated phenols and pyrroles.

11. A battery cell according to claim 1, wherein said cathode comprises a cathode active material selected from inorganic insertion oxides and sulfides, organo-sulfur compounds and conjugated polymers.

12. A battery comprising a battery cell according to claim 1 which further comprises a current collector for said lithium anode, a separate current collector for said cathode and suitable encapsulation to prevent the penetration of air and moisture.

13. A battery cell according to claim 1, wherein said electrically conducting crosslinked polymer film is less than 10 micrometers thick.

14. A battery cell according to claim 13, wherein said electrically conducting crosslinked polymer film is 0.1 to 5 micrometers thick.

15. A battery cell according to claim 1, wherein said electrically conducting crosslinked polymer film is deposited by plasma-assisted vacuum evaporation using conjugated oligomers as an evaporation source.

16. A battery cell according to claim 15, wherein said conjugated oligomers are phenyl oligomers.

17. A battery cell comprising:
   (a) a lithium anode;
   (b) a non-aqueous solid polymer electrolyte containing a dissolved lithium salt;
   (c) a lithium ion conducting polymer film interposed between the lithium anode and the electrolyte; said polymer film being doped electrically conductive and capable of transmitting lithium ions between the lithium anode and the electrolyte by incorporation of lithium ions, wherein said lithium ion-doped polymer film is capable of stabilizing the lithium anode against the formation of dendrites and has the capability to dissolve dendrites and further is capable of stabilizing the lithium anode against reaction with said polymer electrolyte to form a more resistive interfacial layer; and
   (d) a cathode.

18. A battery cell according to claim 17, wherein said lithium ion conducting polymer film is deposited by vacuum evaporation on said lithium anode.

19. A battery cell according to claim 17, wherein said polymer electrolyte is a single-ion conducting polymer electrolyte.

20. A battery cell according to claim 17, wherein said polymer electrolyte is a gel polymer electrolyte.

21. A battery cell according to claim 17, wherein said lithium ion conducting polymer film is deposited by vacuum evaporation on said polymer electrolyte.

22. A battery cell according to claim 17, wherein said lithium ion conducting polymer film is deposited by plasma-assisted vacuum evaporation.

23. A battery cell according to claim 17, wherein said lithium ion conducting polymer film is vacuum deposited using a conjugated polymer as an evaporation source.

24. A battery cell according to claim 23, wherein said conjugated polymer source is selected from the group consisting of poly(p-phenylene), polyacetylene, poly(phenylene vinylene), polyazulene, poly(perinaphthlene), polyacenes, and poly(naphthalene-2,6-diyl).

25. A battery cell according to claim 17, wherein said lithium salt is selected from $LiCF_3SO_3$, $LiClO_4$, $LiAsF_6$, $LiPF_6$, $LiN(SO_2CF_3)_2$, $LiC(SO_2CF_3)_3$, and lithium salts of fluorosulfonated phenols and pyrroles.

26. A battery cell according to claim 17, wherein said cathode comprises a cathode active material selected from inorganic insertion oxides and sulfides, organo-sulfur compounds and conjugated polymers.

27. A battery comprising a battery cell according to claim 17 which further comprises a current collector for said lithium anode, a separate current collector for said cathode and suitable encapsulation to prevent the penetration of air and moisture.

28. A battery cell according to claim 17, wherein said lithium ion conducting polymer film is less than 10 micrometers thick.

29. A battery cell according to claim 28, wherein said film is 0.1 to 5.0 micrometers thick.

30. A battery cell according to claim 17, wherein said lithium ion conducting polymer film is vacuum deposited using a conjugated polymer as an evaporation source and said lithium ion conducting polymer film comprises a conducting polymer with a different chemical structure than said conjugated polymer source.

31. A battery cell according to claim 30, wherein said conjugated polymer source is selected from the group consisting of poly(p-phenylene), polyacetylene, poly(phenylene vinylene), polyazulene, poly(perinaphthalene), polyacenes, and poly(naphthalene-2,6-diyl).

* * * * *